UNITED STATES PATENT OFFICE.

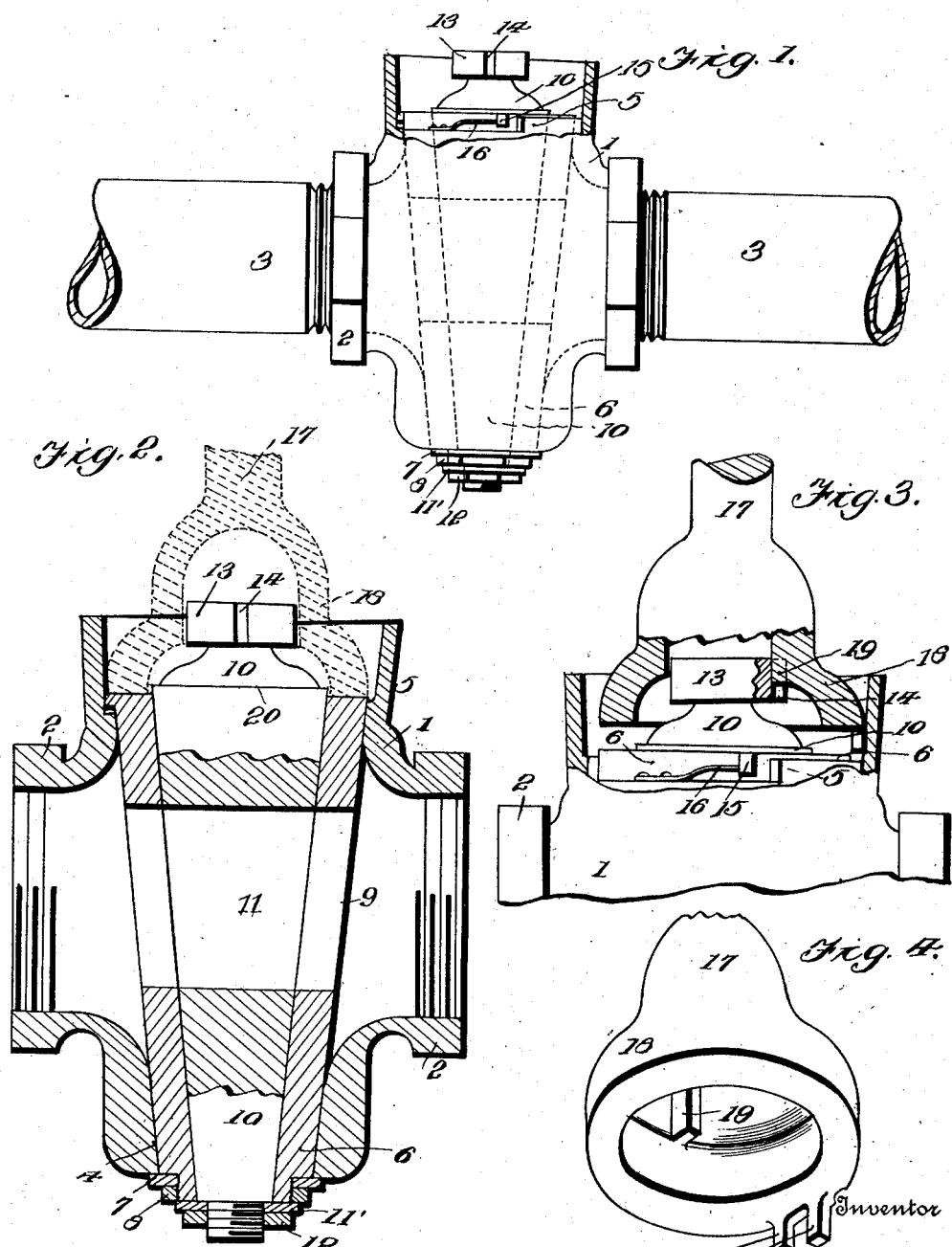

WALTER E. SUESS, OF TAYLOR, TEXAS, ASSIGNOR OF ONE-HALF TO GUSTAV HAMANN, OF TAYLOR, TEXAS.

STOP-COCK.

1,015,358.   Specification of Letters Patent.   Patented Jan. 23, 1912.

Application filed May 17, 1911. Serial No. 627,808.

*To all whom it may concern:*

Be it known that I, WALTER E. SUESS, citizen of the United States, residing at Taylor, in the county of Williamson and State of Texas, have invented certain new and useful Improvements in Stop-Cocks, of which the following is a specification.

This invention relates to stop-cocks especially adapted to be used upon water service pipes and which is provided with a combination set of cores which must be operated in a peculiar manner before the passageway through the cock is opened. In other words the device is in the form of a key operable lock stop-cock, and the parts must be properly manipulated at proper times in order to open the passageway through the same.

For a full understanding of the invention reference is to be had to the following description and accompanying drawings, in which:

Figure 1 is a side elevation of the stop-cock; Fig. 2 is a vertical sectional view of the same; Fig. 3 is a side elevation of a portion of the cock, showing a portion of the key in section; Fig. 4 is a perspective view of an end portion of the key.

Corresponding and like parts are referred to in the following description and indicated in all the views of the accompanying drawings by the same reference characters.

The cock consists of a body 1 having at its opposite sides hexagonal nuts 2 to which are connected the ends of water pipes 3. The body 1 is provided with the usual central conical bore 4, and at its upper end and partially surrounding said bore is an incomplete annular flange 5. A hollow core 6 is seated in the bore 4 and is held therein by means of a washer 7, and a nut 8 is screw threaded upon the lower end of the said core and holds the washer against the lower end of the body 1. This core 6 is provided at opposite sides with openings 9 which at times are adapted to register with the openings in the body 1 and the nuts 2 thereof. A core 10 is journaled in the core 6 and is provided with a transversely disposed opening 11 adapted at times to register with the openings 9 in the core 6. The core 10 is held in position in the core 6 by means of a washer 11' and nut 12 screw threaded upon the lower end of the said core 10 and holding the washer against the lower end of the core 6.

The core 10 is provided at its upper end with a head 13 which in turn is provided upon one side with a vertically disposed groove 14. The core 6 is provided at its upper end with a lug 15 which lies between the ends of the arcuate flange 5 and is adapted when the core 6 is turned to come in contact with the ends of the said flange, whereby the turning movement of the said core is limited. A flat spring 16 is secured at one end to the top of the body 1 between the ends of the arcuate flange 5 thereof and nearer one end of the said flange than the other. The free end portion of this spring projects up into the path of movement of the lug 15 and holds the lug against turning movement to any considerable extent until it is depressed down below the path of movement of the lug.

The key for operating the cock consists of a bar 17 having at its lower end a hollow head 18. This head is provided upon its inner side with a spline 19 which is adapted to enter the groove 14 provided in the head 13 of the core 10. The said head 18 is also provided at its edge with spaced lugs 20 which are adapted to enter the space between the ends of the flange 5 and lie at opposite sides of the lug 15. One of the lugs 20 is adapted to bear down against the free end of the spring 16 and depress the same below the path of movement of the lug 15.

In operation, the key 17 is applied to the upper end of the core 10 so that the spline 19 slips longitudinally within the groove 14 of the head 13 thereof. This core 10 is then given a quarter turn which brings its opening 11 into register with the openings 9 in the core 6. When this happens the lugs 20 are above but at the opposite sides of the lug 15 carried by the core 6. The key is further depressed so that the lugs 20 are moved down along the opposite sides of the lug 15 and one of the lugs 20 depresses the spring 16. Therefore there is no obstruction in the path of movement of the lug 15, and the said lug together with the core 6 may be rotated until the openings 9 are brought into register with the openings through the ends of the body 1, and thus a passageway is opened through the said opening through which water may pass. When the water is shut off, the operation above described is reversed. Therefore it will be seen that unless one is familiar with the manipulation of the cock, it is impossible to open the same to cause a waste or to purloin the water, and even so it would be necessary to have a key to effect the proper relative movements of the parts.

Having thus described the invention, what is claimed as new is:

1. A stop-cock comprising a body having at its opposite sides openings, a hollow core journaled in the body and having at its opposite sides openings, said core being provided at its upper end with a lug which extends over the top of the body, the body being provided at its upper end with an incomplete annular flange in the space between the ends of which the said lug is received, a spring secured to the body in the space between the ends of the flange and having a free end portion elevated into the path of movement of the said lug, a core journaled in the first mentioned core and having an opening adapted to register with the openings in the first mentioned core, and means for bringing the opening in the second mentioned core into register with the openings in the first mentioned core, said means also being adapted to depress the spring out of the path of movement of the lug and engage the same, whereby the said cores may be turned in unison.

2. A stop-cock comprising a body having openings at its opposite sides, said body having at its upper end an interrupted annular flange, a spring attached to the body in the space between the ends of the flange and having an elevated free end portion, a core journaled in the body and having openings at its opposite sides, said core being provided at its upper end with a lug which lies in the space between the ends of said flange, the free end of said spring projecting into the path of movement of the said lug, a second core journaled in the first mentioned core and having an opening adapted to register with the openings in the first mentioned core, a head provided upon the second mentioned core, said head having a vertically disposed slot, and a key carrying a spline adapted to enter the slot of the said head, said key having eccentrically positioned lugs which are adapted to receive between them the first mentioned lug, one of the last mentioned lugs being adapted to depress the spring below the path of movement of the first mentioned lug.

3. A stop-cock comprising a body having at its opposite sides openings, said body being provided at its upper end with an incomplete annular flange, a spring mounted upon the body between the ends of the flange and having a free end portion elevated and depressed toward one end of the flange, a hollow core journaled in the body and having openings at its opposite sides adapted to register with the openings in the body, said core having at its upper end a lug which lies in the space between the ends of the flange and into the path of movement of which the said spring normally projects, a second core journaled in the first mentioned core and having an opening adapted to register with the openings in the first mentioned core, said second mentioned core having at its upper end a head provided with a vertically disposed groove, and a key having a central hollow adapted to receive the said head and provided with a spline adapted to enter the groove in the said head, said key having eccentrically positioned spaced lugs adapted to receive between them the lug upon the first mentioned core and adapted to depress the spring below the path of movement of the first mentioned core, whereby the said cores may be turned in unison.

In testimony whereof, I affix my signature in presence of two witnesses.

WALTER E. SUESS. [L. S.]

Witnesses:
F. B. JONES,
H. C. MANTOR.

---

Copies of this patent may be obtained for five cents each, by addressing the "Commissioner of Patents, Washington, D. C."